US006905905B2

United States Patent
Okumura et al.

(10) Patent No.: US 6,905,905 B2
(45) Date of Patent: Jun. 14, 2005

(54) METHOD OF MANUFACTURING THIN-FILM STRUCTURE

(75) Inventors: Mika Okumura, Tokyo (JP); Makio Horikawa, Tokyo (JP); Kiyoshi Ishibashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/362,131

(22) PCT Filed: Jun. 21, 2001

(86) PCT No.: PCT/JP01/05342
§ 371 (c)(1),
(2), (4) Date: Feb. 21, 2003

(87) PCT Pub. No.: WO03/001608
PCT Pub. Date: Jan. 3, 2003

(65) Prior Publication Data
US 2003/0176008 A1 Sep. 18, 2003

(51) Int. Cl.$^7$ ............................................. H01L 21/00
(52) U.S. Cl. ............................ 438/48; 438/50; 438/52
(58) Field of Search ..................................... 438/48–53

(56) References Cited

U.S. PATENT DOCUMENTS

| 5,510,156 | A | 4/1996 | Zhao |
| 5,550,090 | A | 8/1996 | Ristic et al. |
| 5,665,253 | A | 9/1997 | Kubena et al. |
| 5,789,264 | A | * 8/1998 | Chung .......................... 438/52 |
| 5,879,963 | A | * 3/1999 | Howe et al. ................... 438/52 |
| 6,094,127 | A | 7/2000 | Yong |
| 6,146,917 | A | 11/2000 | Zhang et al. |
| 6,448,622 | B1 | * 9/2002 | Franke et al. ................ 257/415 |

FOREIGN PATENT DOCUMENTS

| EP | 1 024 508 A2 | 8/2000 |
| JP | 5-102145 | 4/1993 |
| JP | 9-260745 | 10/1997 |
| JP | 10-261806 | 9/1998 |
| JP | 2000-183364 | 6/2000 |
| WO | WO 99/35305 | 7/1999 |
| WO | WO 00/26963 | 5/2000 |

* cited by examiner

Primary Examiner—H. Jey Tsai
(74) Attorney, Agent, or Firm—Oblon, Spivak, McClelland, Maier & Neustadt, P.C.

(57) ABSTRACT

A manufacturing method of a thin-film structural body, capable of preparing a thin-film structural body by using a sacrifice film without any protruding part on its surface, thereby preparing a thin-film structural body having high strength and reliability. After a sacrifice film is formed with a film thickness greater than a predetermined value, the surface of the sacrifice film is ground so that the surface of the sacrifice film is flattened with the film thickness of the sacrifice film being adjusted to the predetermined value. Thus, the influence of the surface irregularity of a substrate is eliminated and the surface of the sacrifice film is flattened. Thereby, a mass body, beams and fixed electrodes of a semiconductor acceleration sensor are prepared by using the sacrifice film.

10 Claims, 9 Drawing Sheets

METHOD OF MANUFACTURING THIN-FILM STRUCTURE

TECHNICAL FIELD

The present invention relates to a manufacturing method of a thin-film structural body formed by using a semiconductor processing technique.

BACKGROUND ART

FIG. 13 is a cross-sectional view showing a thin-film structural body formed by using a conventional manufacturing method of a thin-film structural body. As shown in FIG. 13, this thin-film structural body 101, which is provided with a supporting part 103 and a floating part 105 supported by the supporting part 103, is formed above a substrate 107 by using a conductive material. The floating part 105 is placed with a predetermined distance from the substrate 107, and sticks out outward from an upper portion of the supporting part 103.

The substrate 107 is provided with a substrate main body 111, a first insulating film 113 formed on the substrate main body 111, a wiring 115 selectively formed on the insulating film 113, and a second insulating film 117 selectively covering a surface of the wiring 115 and the insulating film 113.

The surface of the insulating film 113 is flat, and the wiring 115 is formed on the surface to protrude therefrom. The supporting part 103 is formed on the wiring 115 in a manner so as to cover one portion of the wiring 115. A hole 117a is formed in the corresponding portion of the insulating film 117 on which the supporting part 103 is to be formed so that the supporting part 103 is connected to the wiring 115 through the hole 117a. The film thickness of the insulating film 117 is made thin to such an extent that a step difference that is caused on the surface of the substrate 107 by the influence of the circumferential edge of the insulating film 117 becomes substantially ignorable.

In the conventional manufacturing method of a thin-film structural body, first, a sacrifice film 121 is formed on the substrate 107 having such a configuration as shown in FIG. 14. Next, a portion of the sacrifice film 121 at which the supporting part 103 is to be formed is partially removed so that, as shown in FIG. 15, an anchor hole part 121a is formed.

Successively, a thin-film layer 123 is deposited on the surface of the sacrifice film 121 and the surface of the substrate 107 exposed through the anchor hole part 121a by using a conductive material, as shown in FIG. 16.

Next, the thin-film layer 123 is selectively removed and patterned so that residual portions of the thin-film layer 123 form a thin-film structural body 101. In this case, a portion which has been fitted into anchor hole part 121a of the residual portion forms the supporting part 103, and another portion located on the sacrifice film 121 forms the floating part 105. Then, the sacrifice film 121 is removed so that a structure shown in FIG. 13 is obtained.

In such a conventional manufacturing method, in a state shown in FIG. 14, a protruding part 122a is formed on the surface 122 of the sacrifice film 121 due to the wiring 115 of the substrate 107. When such a sacrifice film 121 having the protruding part 122a is used for preparing the thin-film structural body 101, the following problems are raised.

The protruding part 122a has a slanting portion H which is located above the outer edge of the wiring 115 and which approaches the substrate 107 in a direction toward the outside of the wiring 115. With respect to the thickness of the supporting part 103, there is a limitation in that if it is too thick, reduction of space is not available, and in that if it is too thin, there might be a failure in the electrical connection between the thin-film structural body 101 and the wiring 115. Moreover, with respect to the width of the wiring 115, it needs to be thinner in order to save space, depending on its layout positions and purposes of use. For this reason, in the case of the width of the wiring 115 which is made thinner, the supporting part 103 is formed on the wiring 115 with a thickness that is almost the same as the width of the wiring 115 as shown in FIG. 13. In a corresponding manner, the anchor hole part 121a is also formed on the wiring 115 with an opening width which is almost the same as the width of the wiring 115. As a result, as shown in FIG. 15, at least one portion of the slanting portion H remains on the peripheral portion 121b of the anchor hole part 121a of the sacrifice film 121.

The surface shape of this peripheral portion 121b is reflected to the shape of the thin-film structural body 101 so that a neck portion 131 is formed at a portion corresponding to the peripheral portion 121 of the thin-film structural body 101, more specifically, a coupling portion between the supporting part 103 and the floating part 105, as shown in FIG. 13. For this reason, the thin-film structural body 101 might be damaged at the neck portion 131 by an impact or the like, resulting in degradation in the strength and reliability of the thin-film structural body 101.

DISCLOSURE OF THE INVENTION

The present invention has been devised to solve the above-mentioned problems, and an object thereof is to provide a manufacturing method of a thin-film structural body, capable of preparing a thin-film structural body by using a sacrifice film without any protrusion on its surface, thereby preparing a thin-film structural body having high strength and reliability.

According to a first aspect of a manufacturing method of a thin-film structural body in accordance with the present invention, in the manufacturing method of a thin-film structural body including: a supporting part (23b, 25a) formed on a substrate (1); and a floating part (21, 23a, 25b, 25c) integrally formed with the supporting part, supported by the supporting part and placed with a predetermined distance from the substrate, the manufacturing method includes the steps of: forming a sacrifice film (51) on the substrate with a film thickness greater than a predetermined value corresponding to the predetermined distance; flattening a surface of the sacrifice film; forming an anchor hole part (51a) by selectively removing a portion of the sacrifice film on which the supporting part is to be formed; depositing a thin-film layer (53) on the sacrifice film and the substrate exposed through the anchor hole part; selectively removing and patterning the thin-film layer so that a residual portion of the thin-film layer is allowed to form the thin-film structural body (21, 23, 25); and removing the sacrifice film.

According to this aspect, after a sacrifice film is formed with a film thickness greater than a predetermined value, the surface of the sacrifice film is flattened; therefore, the flattening process of the surface of the sacrifice film can be carried out without being adversely affected by the irregularity on the surface of the substrate. Consequently, since the thin-film structural body can be prepared by using the sacrifice film having a flat surface, it is possible to prevent an undesired nick portion from being formed in the thin-film structural body due to the irregularity of the surface of the sacrifice film, and consequently to improve the strength and reliability of the thin-film structural body.

According to a second aspect of the manufacturing method of a thin-film structural body in accordance with the present invention, in the step of flattening the surface of the sacrifice film, the surface of the sacrifice film is ground.

According to a third aspect of the manufacturing method of a thin-film structural body in accordance with the present invention, in the step of flattening the surface of the sacrifice film, the film thickness of the sacrifice film is adjusted to a value which is equal to the predetermined value.

According to a fourth aspect of the manufacturing method of a thin-film structural body in accordance with the present invention, in the step of depositing the thin-film layer, the thin-film layer is deposited with a film thickness greater than the film thickness of the sacrifice film which has been flattened.

According to this aspect, since the film thickness of the thin-film layer is set to be greater than the film thickness of the sacrifice film which has been flattened so that the inside of the anchor hole part is completely filled with the thin-film layer. With this arrangement, it is possible to prevent the edge of an opening of the anchor hole part of the sacrifice film from causing a reduction in the thickness of the portion of the thin-film structural body corresponding to the edge, and resulting in degradation in the strength.

According to a fifth aspect of the manufacturing method of a thin-film structural body in accordance with the present invention, the substrate includes a wiring (41, 43, 45) formed in a manner so as to protrude from the surface of the substrate, the supporting part and the floating part are made from a conductive material, and the supporting part is formed on the wiring so as to be electrically connected to the wiring.

According to this aspect, it is possible to flatten the surface of the sacrifice film by eliminating adverse effects from the wiring on the substrate, and consequently to prevent a neck portion from being formed in the coupling portion between the supporting part and the floating part of the thin-film structural body, which has raised a problem in the above-mentioned conventional technique.

According to a sixth aspect of a manufacturing method of a thin-film structural body in accordance with the present invention, in the manufacturing method of a thin-film structural body including: a conductive supporting part (23b, 25a) formed on a wiring (41, 43, 45) formed on a surface of a substrate (1); and a conductive floating part (21, 23a, 25b, 25c) supported by the supporting part and placed with a predetermined distance from the substrate, the manufacturing method includes the steps of: forming a groove (33a) having a depth of not less than the film thickness of the wiring on the surface of the substrate corresponding to at least a portion of the wiring placed below the supporting part; forming the wiring on the surface of the substrate on which the groove has been formed; forming a sacrifice film (51) covering the surface of the wiring and the surface of the substrate; forming an anchor hole part (51a) by selectively removing a portion of the sacrifice film on which the supporting part is to be formed; depositing a thin-film layer (53) by using a conductive material on the sacrifice film and the substrate exposed through the anchor hole part; selectively removing and patterning the thin-film layer so that residual portions of the thin-film layer are allowed to form the thin-film structural body (21, 23, 25); and removing the sacrifice film.

According to this aspect, at least a portion of the wiring on which the supporting part is to be provided is embedded in the groove having a depth of not less than the film thickness of the wiring provided on the surface of the substrate; therefore, it is possible to prevent a protruding part being formed on the surface of the substrate at the portion on which the supporting part is to be provided. Consequently, it becomes possible to form a sacrifice film having a surface without any protruding part at a portion on which the supporting part is to be provided without the necessity of carrying out a complex process on the sacrifice film, e.g., a flattening process. Moreover, the application of this sacrifice film for preparing a thin-film structural body makes it possible to prevent a neck portion from being formed at the coupling section between the supporting part and the floating part of the thin-film structural body, which has raised a problem in the conventional technique, and consequently to improve the strength and reliability in the thin-film structural body.

According to a seventh aspect of the manufacturing method of a thin-film structural body in accordance with the present invention, in the step of depositing the thin-film layer, the thin-film layer is deposited with a film thickness greater than the film thickness of the sacrifice film.

According to this aspect, since the film thickness of the thin-film layer is set to be greater than the film thickness of the sacrifice film, the inside of the anchor hole part is completely filled with the thin-film layer. With this arrangement, it is possible to prevent the edge of an opening of the anchor hole part of the sacrifice film from causing a reduction in the thickness of the portion of the thin-film structural body corresponding to the edge, and resulting in degradation in the strength.

According to an eighth aspect of the manufacturing method of a thin-film structural body in accordance with the present invention, the depth of the groove is set to be equal to the film thickness of the wiring.

According to this aspect, since the depth of the groove is set to be equal to the film thickness of the wiring, it is possible to flatten the surface of the substrate without the necessity of particularly carrying out a flattening process on the portion on which the supporting part is to be provided.

According to a ninth aspect of the manufacturing method of a thin-film structural body in accordance with the present invention, the step of forming the wiring includes the steps of: depositing a conductive film (55) on the substrate having the groove with the same film thickness as the depth of the groove by using the same material as the wiring; and patterning the conductive film so as to remove a portion of the conductive film other than a portion (55a) located inside the groove with a predetermined gap dimension (F) from each of the side edges of the groove so that the residual portion is allowed to form the wiring.

According to this aspect, since the portion of the conductive film formed on the substrate, located inside the groove with a predetermined gap dimension from each of the side edges of the groove, is left, with the other portion being removed, and the residual portion of the conductive film is allowed to form the wiring so that it is possible to form the wiring with a uniform film thickness, and consequently to further flatten the surface of the sacrifice film by flattening the surface of the substrate.

According to a tenth aspect of the manufacturing method of a thin-film structural body in accordance with the present invention, the thin-film structural body forms at least one portion of a sensor part (3) which is installed in an acceleration sensor and which has a function of detecting acceleration.

According to this aspect, it is possible to improve endurance of the sensor part against an impact which is caused, for example, when the acceleration sensor is dropped, and consequently to improve strength and reliability of the acceleration sensor.

According to an eleventh aspect of the manufacturing method of a thin-film structural body in accordance with the present invention, at least one portion of a circumferential edge of the supporting part (23b) is placed above an outer edge of the wiring (43, 45), and the floating part (23a) sticks out from the one portion of the supporting part and extends in a direction departing from the outer edge of the wiring.

These and other objects, features, aspects and advantages of the present invention will become more apparent in conjunction with the following detailed and the accompanying drawings.

BEST MODE FOR CARRYING OUT THE INVENTION

Embodiment 1

Figure 1:
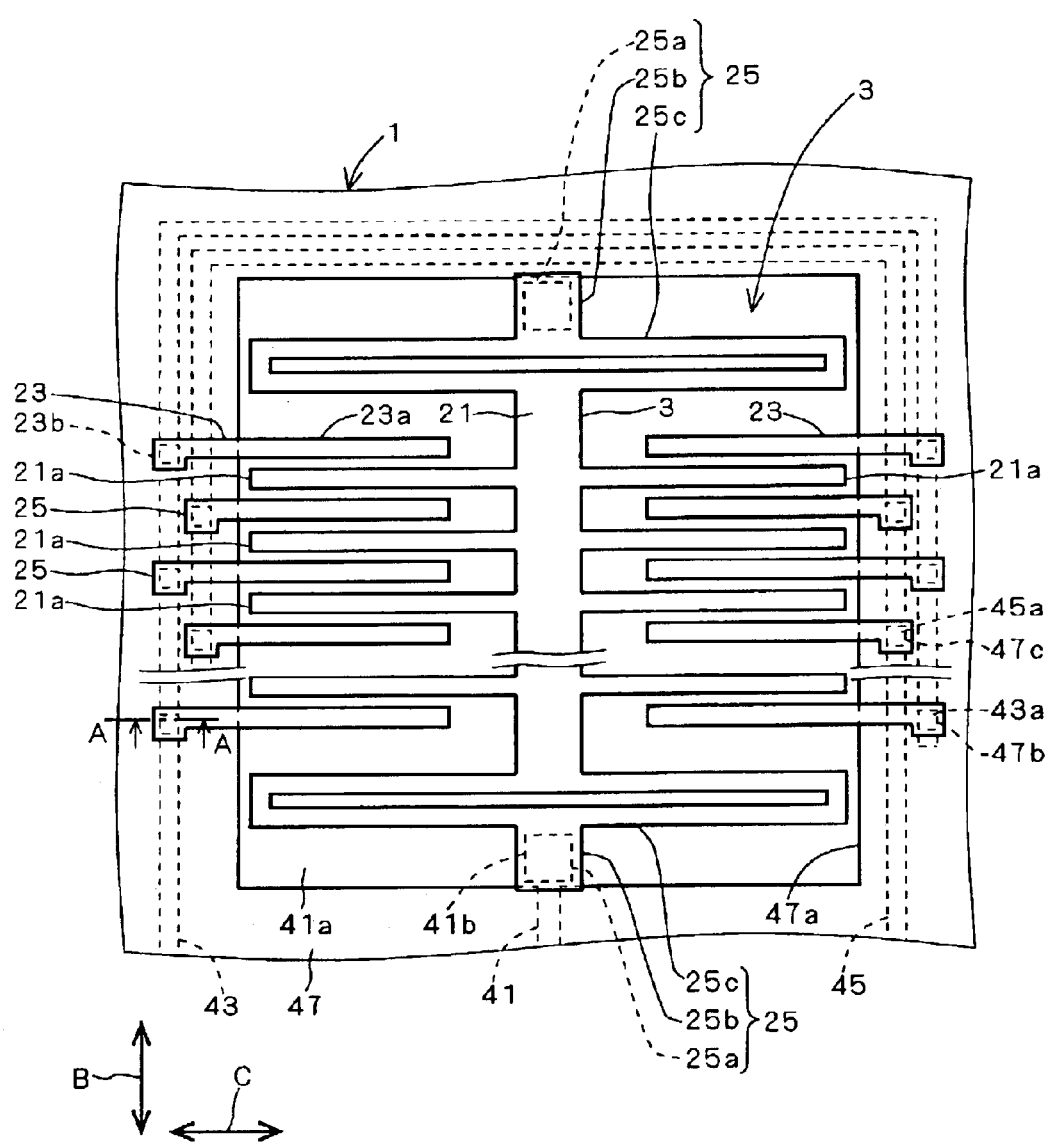
FIG. 1 is a plan view showing a configuration of a main part of a semiconductor acceleration sensor to which a manufacturing method of a thin-film structural body according to embodiment 1 of the present invention is applied.
Figure 2:
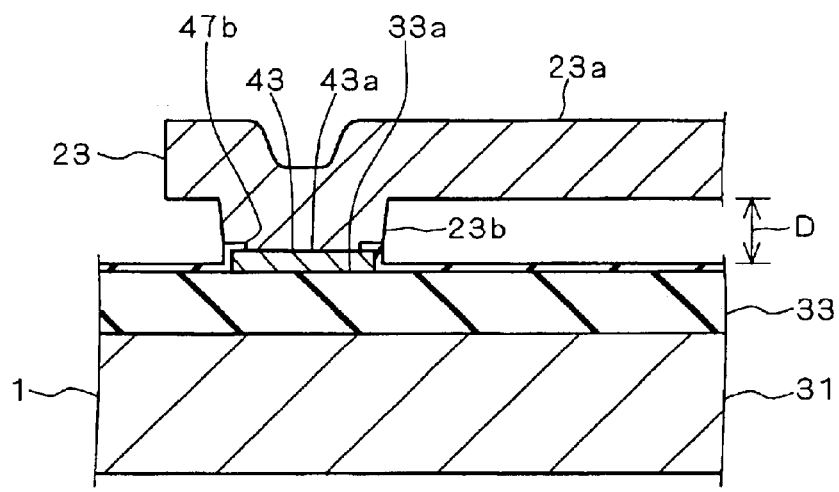
FIG. 2 is a cross-sectional view taken along line A—A of FIG. 1.

As shown in FIGS. 1 and 2, a semiconductor acceleration sensor to which a manufacturing method of a thin-film structural body of embodiment 1 of the present invention is applied is provided with a substrate 1 serving as a sensor substrate, and a sensor part 3 which is formed on the substrate 1 and which has a function of detecting acceleration.

As shown in FIG. 1, the sensor part 3 is provided with a mass body 21 functioning as a movable electrode, a plurality of fixed electrodes 23 and a plurality of beams 25. The mass body 21, the fixed electrodes 23 and the beams 25, which correspond to a thin-film structural body of the present invention, are formed by a conductive material, e.g., doped polysilicon which is formed by doping an impurity, e.g., phosphorus in polysilicon.

The mass body 21, which is placed with a predetermined distance D from the substrate 1, has a plurality of movable electrode portions 21a extending in a direction C which is perpendicular to direction B of acceleration to be detected. The beams 25, which are integrally formed with the mass body 21, has a function of suspending the mass body 21 above the substrate 1 movably in direction B with a restoring force. Each of the beams 25 is provided with a supporting part 25a protruding from the substrate 1, a coupling portion 25b to the supporting part 25a, and a spring portion 25c provided between the coupling portion 25b and the end edge of the mass body 21 with respect to direction B. This spring portion 25c is elastically bent and deformed so that the distance between the coupling portion 25b and the mass body 21 in direction B is expanded and reduced.

In such a configuration of the mass body 21 and the beams 25, the mass body 21, and the spring portion 25c and the coupling portion 25b and the beams 25 correspond to the floating part of the thin-film structural body according to the present invention.

The respective fixed electrodes 23 are placed along direction C with predetermined distances in direction B between each other. Moreover, each fixed electrode 23 is provided with a fixed electrode portion 23b forming a floating part which is placed with a predetermined distance D from the substrate 1, and a supporting part 23b supporting the fixed electrode portion 23a.

The fixed electrode portions 23b of the respective fixed electrodes 23 and the movable electrode portions 21a of the mass body 21 are alternately placed with distances from each other in direction B, thereby forming a capacitor. Thus, acceleration is detected based upon capacity changes in the capacitor that are generated due to shifts of movable electrode portions 21a.

As shown in FIGS. 1 and 2, the substrate 1 is provided with a substrate main body 31 formed by a semiconductor such as silicon, an oxide film 33 serving as a first insulating film formed on the substrate main body 31, a plurality of wirings 41, 43, 45 selectively formed on the oxide film 33, and a nitride film 47, which serves as a second insulating film, selectively covering the surface of the wirings 41, 43, 45 and the surface of the oxide film 33.

The wiring 41 is provided with an exposed portion 41a placed on the substrate 1 in an exposed state at an opposing area which faces the mass body 21 of the substrate 1, and a contact portion 41b placed below the supporting part 25a and electrically connected to the supporting part 25a. The wirings 43, 45, which are used for drawing signals from the fixed electrodes 23, are connected to the respective fixed electrodes 23 through the contact portions 43a, 45a.

In a corresponding manner, the nitride film 47 has a window portion 47a and holes 47b and 47c. The exposed portion 41a of the wiring 41 is exposed to the substrate 1 through the window portion 47a, and the contact portion 41a is electrically connected to the supporting part 25a. The contact portions 43a, 45a of the wirings 43, 45 are electrically connected to the fixed electrodes 23 through the holes 47b, 47c.

In the semiconductor acceleration sensor having the above-mentioned arrangement, in the present embodiment, the wirings 41, 43, 45 are formed on the flat surface of the oxide film 33 in a manner so as to protrude therefrom. Moreover, the film thickness of the nitride film 47 is made thin to such an extent that a step difference caused on the surface of the substrate 1 by the influence of its circumferential edge becomes substantially ignorable. Therefore, the portions of the surface of the substrate 1 on which the wirings 41, 43, 45 are formed are allowed to protrude upward from the other portions by an amount corresponding to the film thickness of each of the wirings 41, 43 45.

Moreover, with respect to the thickness of the supporting part 25a, 23b, there is a limitation in that if it is too thick, reduction of space is not available, and in that if it is too thin, there might be a failure in the electrical connection between the mass body 21 and the wiring 41 through the beams 25 and the electrical connection between the fixed electrodes 23 and the wirings 43, 45. Moreover, with respect to the width of the wirings 43, 45, it is made thinner in order to save space. For this reason, the supporting part 23b of the fixed electrodes 23 are formed on the wirings 43, 45 with a thickness that is almost the same as the width of the wirings 43, 45. As a result, at least one portion of the circumferential edge of the supporting part 23b is located above the outer edges of the wirings 43, 45. Moreover, the fixed electrode portions 23a are allowed to stick out from the one portion and extend in a thin rod state in a direction departing from the edge of the wirings 43, 45. Here, the mass body 21 and the beams 25 are formed in an area surrounded by the outer edge of the wiring 41.

In accordance with such a configuration of the semiconductor acceleration sensor 1, in the present embodiment, the mass body 21, the beams 25 and the fixed electrodes 23 are prepared in the following manufacturing method.

Figure 3:
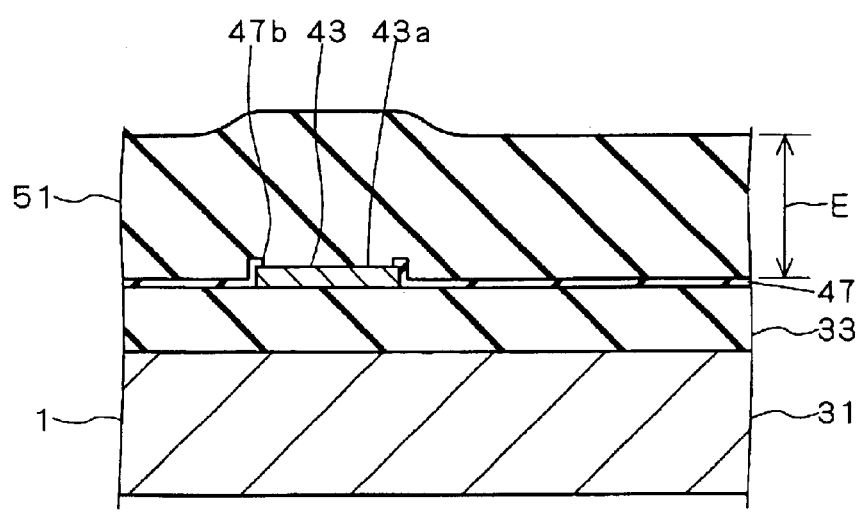
FIGS. 3 to 6 are cross-sectional views showing manufacturing processes of the structure shown in FIG. 2.

First, as shown in FIG. 3, a sacrifice film 51 is formed on the substrate 1. In this case, the film thickness E of the sacrifice film 51 is set to a value approximately two times the distance D between the substrate 1 and the mass body 21 as well as the fixed electrode portions 23a. The sacrifice film 51 is formed by an oxide film, PSG or BPSG, for example.

Figure 4:
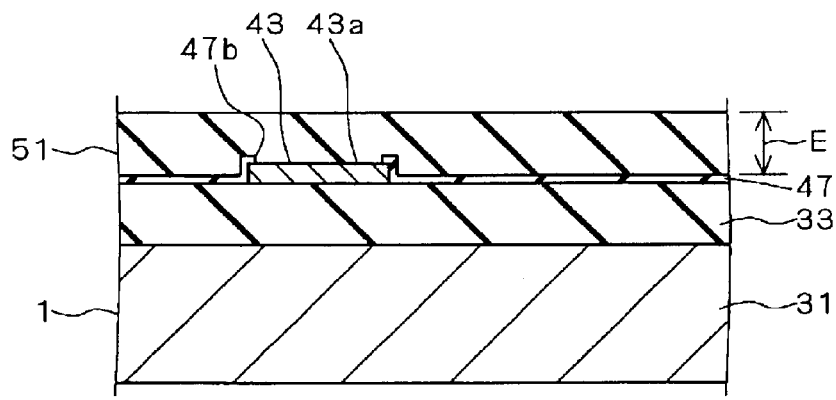

Successively, an etching back process which grinds the surface of the sacrifice film 51 is carried out so that, as shown in FIG. 4, the surface of the sacrifice film 51 is flattened and the film thickness E of the sacrifice film 51 is adjusted to a value which is equal to the distance D.

Figure 5:
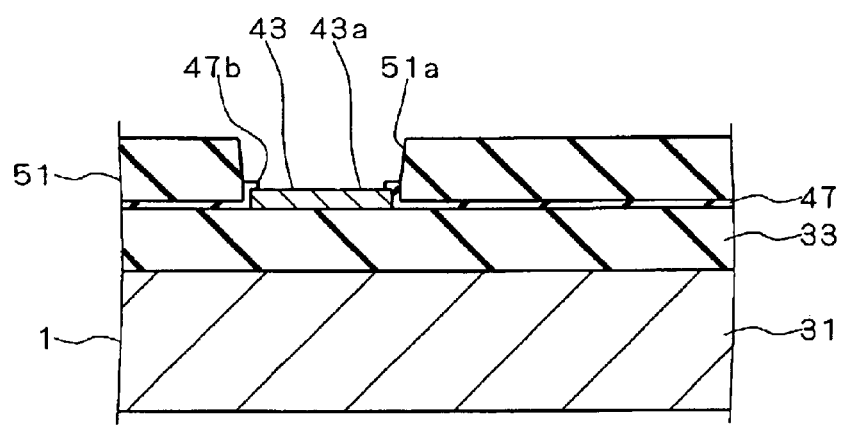

Then, portions of the sacrifice film 51, in which the supporting parts 25a, 23b are to be formed, are selectively removed to form anchor hole parts 51a. Thus, a structure shown in FIG. 5 is obtained. At this time, on the bottom of the anchor hole part 51a, the contact portions 41b, 43a, 45a of the wirings 41, 43, 45 are exposed through the window portion 47a and the holes 47b, 47c of the nitride film 47.

Figure 6:
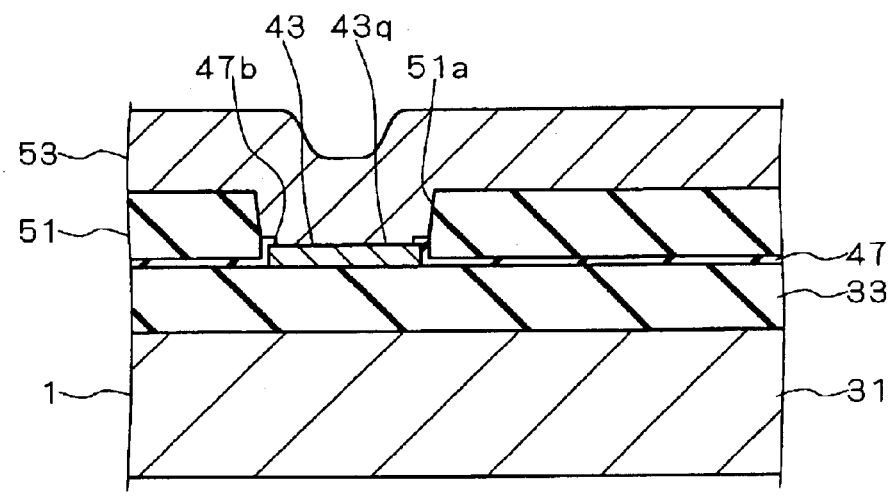

As shown in FIG. 6, a thin-film layer 53 is deposited on the residual sacrifice film 51 and the substrate 1 exposed through the anchor hole part 51a by using a conductive material, e.g., doped polysilicon. The film thickness of this thin-film layer 53 is set to a value greater than the film thickness E of the sacrifice film 53 which has been flattened. As a result, the inside of the anchor hole part 51a is completely filled with the thin-film layer 53.

Successively, the thin-film layer 53 is selectively removed and patterned so that residual portions of the thin-film layer 53 are allowed to form the mass body 21, the beams 25 and the fixed electrodes 23. In this case, portions of the residual portions, which have been fitted into the inside of the anchor hole part 5 la, are allowed to form the supporting parts 25a, 23b, and portions located on the sacrifice film 51 are allowed to form the mass body 21, the spring portion 25c, the coupling portions 25b and the fixed electrode portions 23a. Then, the sacrifice film 51 is removed so that a structure shown in FIGS. 1 and 2 is obtained.

As described above, according to the present embodiment, after the sacrifice film 51 has been formed with a film thickness E greater than a predetermined value, the surface of the sacrifice film 51 is ground so that the surface of the sacrifice film 51 is flattened with the film thickness E of the sacrifice film 51 being adjusted to a predetermined value; thus, it becomes possible to flatten the surface of the sacrifice film 51 with the influence of the irregularity of the surface of the substrate 1 being eliminated. As a result, since the mass body 21, the beams 25 and the fixed electrodes 23 can be prepared by using the sacrifice film 51 having a flat surface, it is possible to prevent an undesired neck portion being formed on the mass body 21, the beams 25 and the fixed electrodes 23 due to the irregularity of the surface of the sacrifice film 51, consequently to improve the strength and reliability of the sensor part 3.

In particular, each fixed electrode 23 is formed in a manner so as to bridge the outer edges of the wirings 43 and 45 at the connecting section between the supporting part 23b and the fixed electrode portion 23a; therefore, in the case where each fixed electrode 23 is prepared by the conventional manufacturing method, a neck portion is formed in the connecting section between the fixed electrode portion 23a and the supporting part 23b, causing degradation in the shock resistance of the fixed electrode 23. However, in accordance with the manufacturing method of the present embodiment, the fixed electrodes 23 are prepared without causing any neck portion, making it possible to improve the shock resistance of the fixed electrodes 23.

Moreover, since the film thickness of the thin-film layer 53 is set to be greater than the film thickness E of the sacrifice film 51 which has been flattened, the inside of the anchor hole part 51a can be filled with the thin-film layer 53. Therefore, it becomes possible to prevent the edge of an opening of the anchor hole part 51a of the sacrifice film 51 from causing a reduction in the thickness of the portion of the beams 25 and the fixed electrodes 23 corresponding to the edge, and resulting in degradation in the strength.

Embodiment 2

The semiconductor acceleration sensor, which is prepared by using the manufacturing method of a thin-film structural body according to the present embodiment, is only different from the above-mentioned semiconductor acceleration sensor shown in FIG. 1 and FIG. 2 in that the wirings 41, 43, 45 are substantially embedded in the surface of the substrate 1. Therefore, with respect to the semiconductor acceleration sensor to which the manufacturing method in accordance with the present embodiment is applied, those constituent parts which are the same as those of the semiconductor acceleration sensor shown in FIG. 1 and FIG. 2 are indicated by the same reference numerals, and the description thereof will not be repeated.

Figure 7:
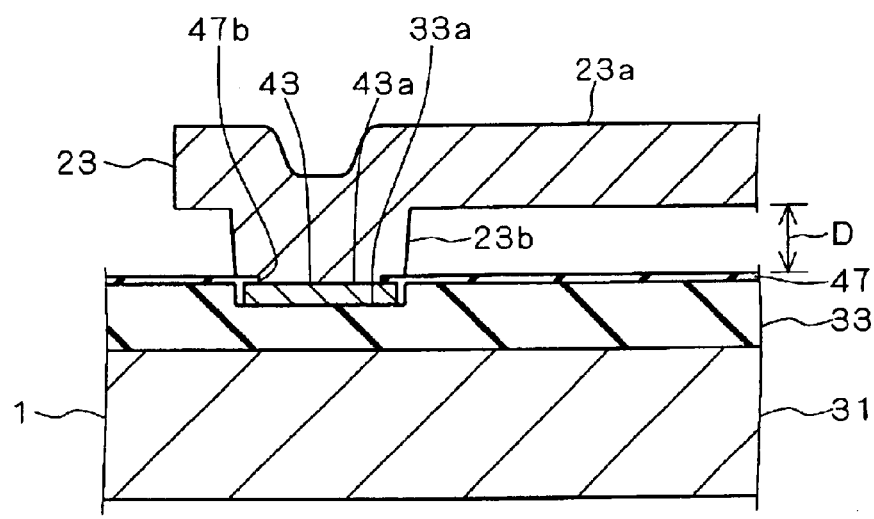
FIG. 7 is a cross-sectional view taken along line A—A of FIG. 1, which shows a case where a manufacturing method of a thin-film structural body of embodiment 2 of the present invention is applied to the acceleration sensor shown in FIG. 1.

In the manufacturing method in accordance with the present embodiment, the wirings 41, 43, 45 are embedded in the surface of the substrate 1 so that the surface of the substrate 1 is flattened, and by forming the sacrifice film 51 on the substrate 1, it becomes possible to obtain a sacrifice film 51 having a flat surface without carrying out a special treatment, such as an etching back process, thereon. Referring to FIGS. 7 to 12, the following description will be given of the contents of the embodiment in detail. FIG. 7 shows a state where the semiconductor acceleration sensor has been completed. It is noted that FIGS. 7 to 12 only show a portion in which the wiring 43 of the wirings 41, 43, 45 is prepared.

Figure 8:
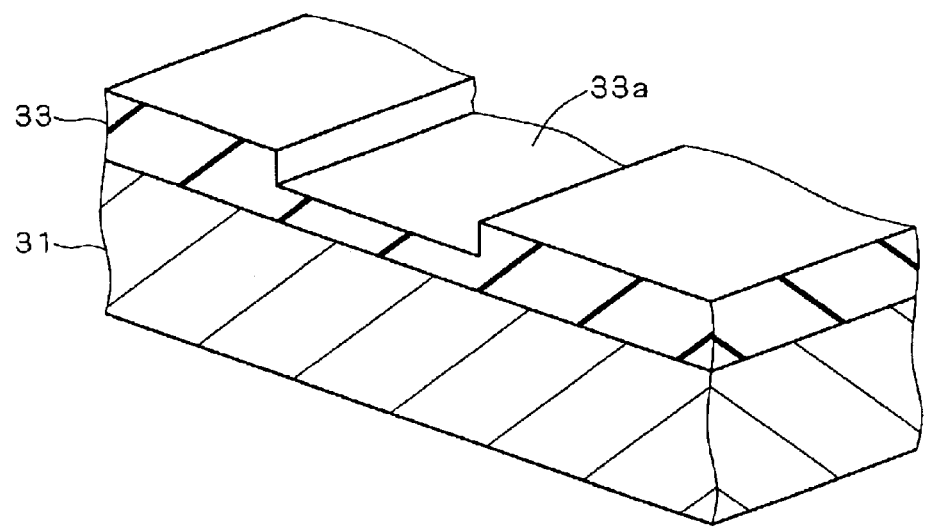
FIGS. 8 to 12 are views showing manufacturing processes of a structure shown in FIG. 7.

First, an oxide film 33 is formed on a substrate main body 31, and groove 33a is formed in a portion corresponding to the wirings 41, 43, 45 on the surface of the oxide film 33. Thus, a structure shown in FIG. 8 is obtained.

Figure 9:
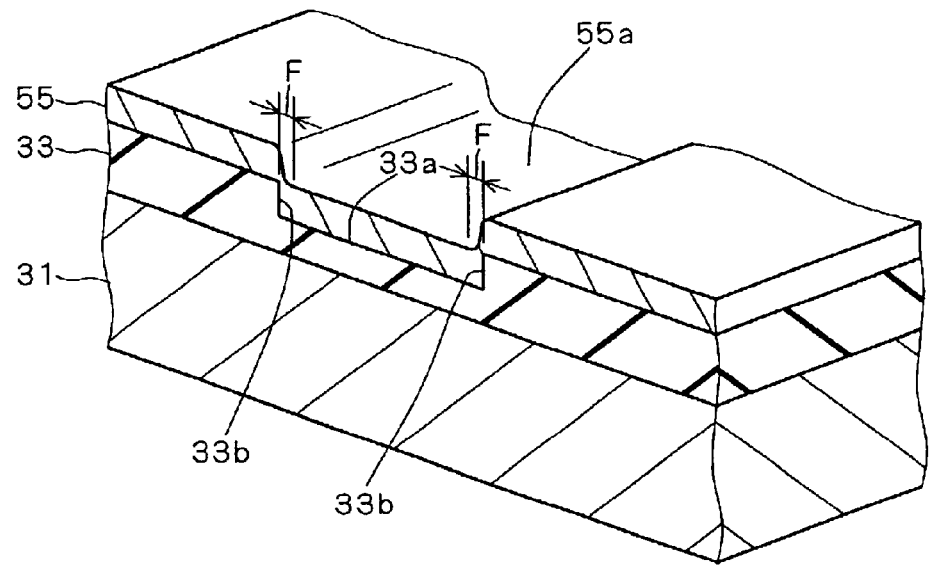

Successively, a conductive film 55, used for forming the wirings 41, 43, 45, is formed on the oxide film 33. Consequently, a structure shown in FIG. 9 is obtained. The material of this conductive film 55 is the same as the material of the wirings 41, 43, 45, and its film thickness is set to the same as the depth of the groove 33a.

Figure 10:
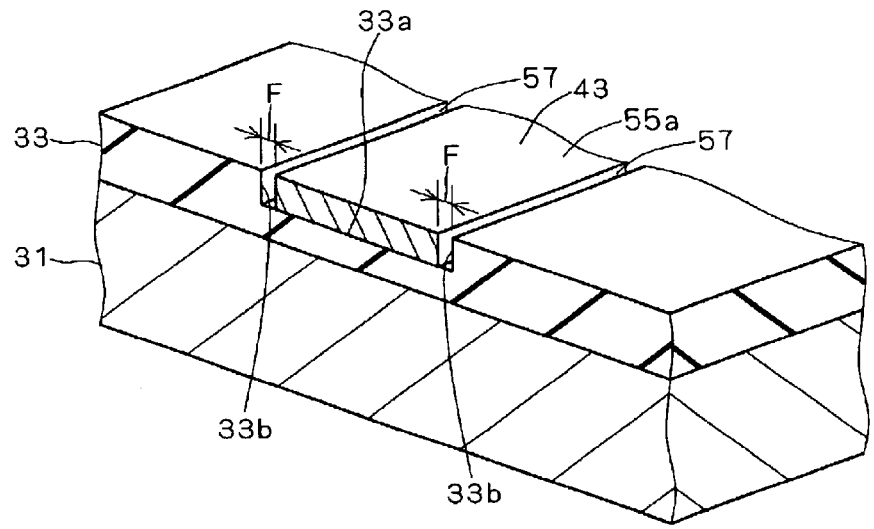

Then, the conductive film 55 is selectively removed and patterned by using a mask pattern which is not shown. A portion except for a portion 55a of the conductive film 55 located inside the groove 33a with a predetermined gap dimension F from each of the side edges 33b of the groove 33a is removed. Consequently, a structure shown in FIG. 10 is obtained. The wirings 41, 43, 45 are formed by this residual portion 55a. In this case, the surface of the wirings 41, 43, 45 and the surface of the oxide film 33 are located on the same plane.

In this manner, each of the wirings 41, 43, 45 is formed inside the groove 33a with a margin corresponding to the gap dimension F from each of the side edges 33b so that it is possible to form wirings 41, 43, 45 having a flat surface with a uniform film thickness. The value of the gap dimension F is set to not more than 0.5 μm, e.g., 0.3 μm. In this case, a gap 57 corresponding to the dimension F is provided between the circumferential portion of each of the wirings 41, 43, 45 and each of the side edges 33b of the groove 33a.

It is noted that, in an attempt to obtain a sufficient effect by preventing a protruding part from being formed on the surface of the substrate 1 due to the influence of each of the wirings 41, 43, 45, the depth of the groove 33a may be set to a value greater than the film thickness of each of the wirings 41, 43, 45. In this case, the surface of each of the wirings 41, 43, 45 is located below the surface of the oxide film 33; however, this arrangement makes it possible to prevent a protruding part from being formed on the surface of the substrate 1 due to the influence of each of the wirings 41, 43, 45.

Figure 11:
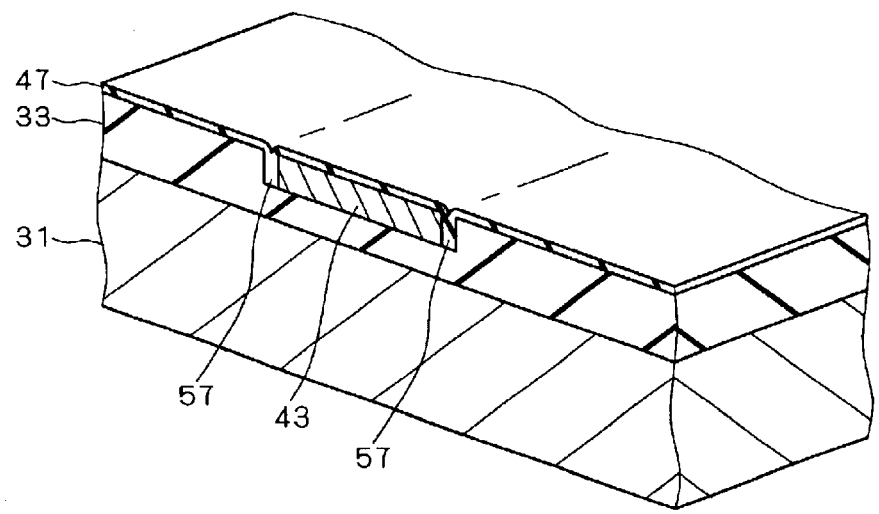

Successively, a nitride film 47 is formed on the entire surface area of the substrate 1 in a manner so as to cover the wirings 41, 43, 45. Thus, a structure shown in FIG. 11 is obtained. At this time, the inside of the gap 57 is filled with the nitride film 47. Successively, the nitride film 47 is selectively removed by using a mask pattern which is not shown; thus, a window portion 47a and holes 47b, 47c are formed.

Here, the film thickness of the nitride film 47 is made thin to such an extent that a step difference caused on the surface of the substrate 1 by the influence of its circumferential edge becomes substantially ignorable, and set to a uniform value. Consequently, the surface of the substrate 1 is set in a substantially flat state.

Figure 12:
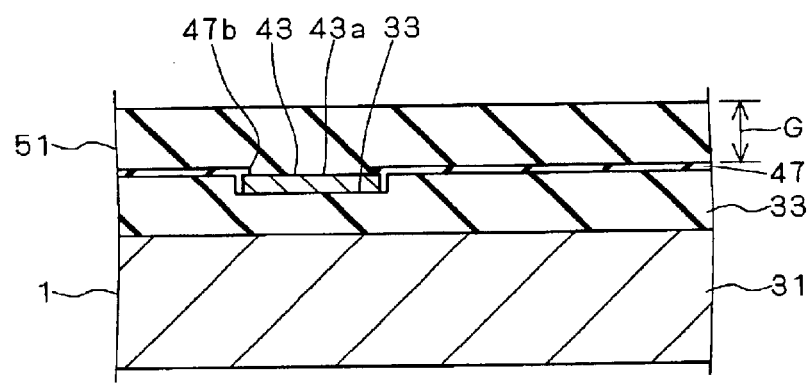
Figure 13:
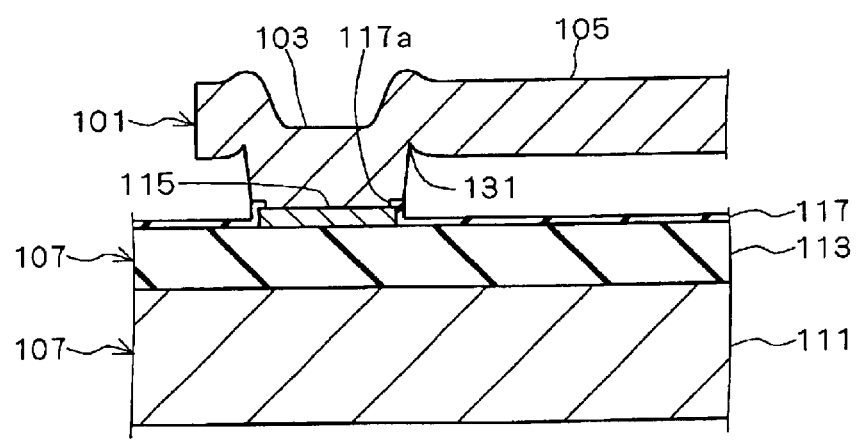
FIG. 13 is a cross-sectional view showing a structure of a thin-film structural body formed by a conventional manufacturing method of a thin-film structural body.
Figure 14:
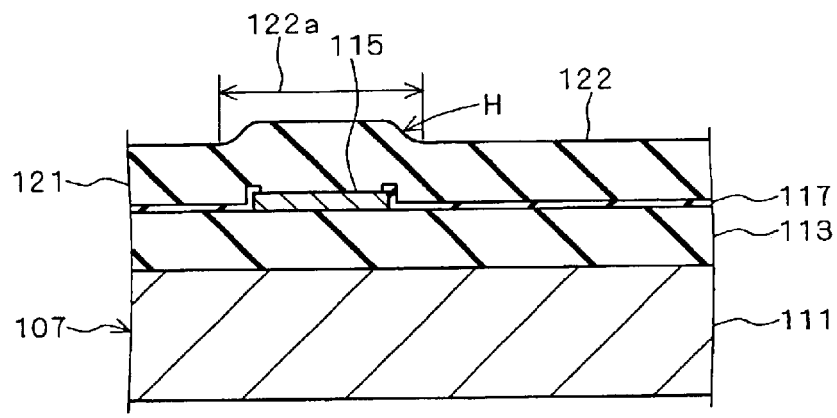
FIGS. 14 to 16 are cross-sectional views showing manufacturing processes of the thin-film structural body shown in FIG. 13.
Figure 15:
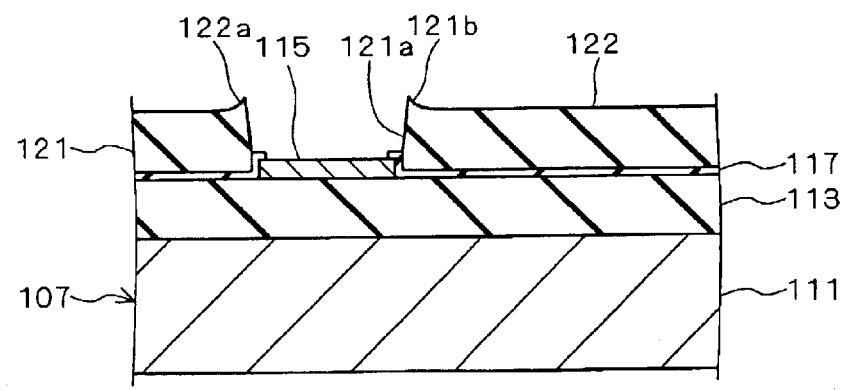
Figure 16:
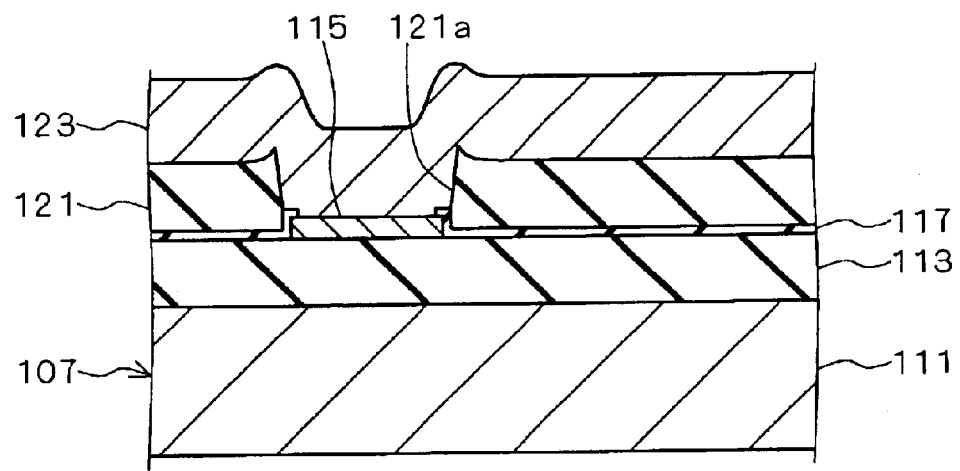

Successively, as shown in FIG. 12, a sacrifice film 51 is formed on the substrate 1 formed in this manner with a film thickness G. This film thickness G is set to a predetermined value corresponding to a gap D. Since the surface of the substrate 1 is substantially flat, the surface of the sacrifice film is maintained in a flat state without the necessity of a special treatment, e.g., an etching back process.

With respect to the succeeding processes, the same processes as those shown in FIGS. 5 and 6 are carried out; therefore, the description thereof will be given briefly. After the sacrifice film 51 has been formed as described above, portions of the sacrifice film 51 on which the supporting parts 25a, 23b are to be formed are selectively removed so that an anchor hole part 51a is formed. Next, a thin-film layer 53 is deposited on the residual sacrifice film 51 and the substrate 1 exposed through the anchor hole part 51a by using a conductive material, e.g., doped polysilicon. Successively, the thin-film layer 53 is selectively removed and patterned so that residual portions of the thin-film layer 53 are allowed to form the mass body 21, the beams 25 and the fixed electrodes 23. In this case, portions of the residual portions, which have been fitted into the inside of the anchor hole part 51a, are allowed to form the supporting parts 25a, 23b, and portions located on the sacrifice film 51 are allowed to form the mass body 21, the spring portion 25c, the coupling portions 25b and the fixed electrode portions 23a. Then, the sacrifice film 51 is removed so that a structure shown in FIG. 7 is obtained.

As described above, in accordance with the present preferred embodiment, the wirings 41, 43, 45 are embedded in the groove 33a having the same depth as the film thickness of the wirings 41, 43, 45 provided on the surface of the substrate 1; therefore, it is possible to flatten the surface of the substrate 1, and consequently to form a sacrifice film 51 having a flat surface without the necessity of a complex flattening treatment to be carried out on the sacrifice film 51. Then, the mass body 21, the beams 25 and the fixed electrodes 23 are prepared by using this sacrifice film 51 so that the same effects as the above-described embodiment 1 are obtained.

In particular, in the present embodiment, each of the wirings 41, 43, 45 is formed with a margin corresponding to a gap dimension F from each of the side edges 33b of the groove 33a to the inside of the groove 33a so that it is possible to form the wirings 41, 43, 45 having a flat surface with a uniform film thickness. Consequently, even when the nitride film 47 is formed with a uniform film thickness, the surface of the substrate 1 is flattened more effectively so that the surface of the sacrifice film 51 is further flattened.

While the present invention has been described in detail, the above description is illustrative in all aspects and the present invention is not restricted thereto. It will be understood that numerous variants which are not illustrated can be supposed without departing from the scope of the invention.

What is claimed is:

1. A manufacturing method of a thin-film structural body including a supporting part formed on a substrate and a floating part integrally formed with said supporting part, supported by said supporting part and placed with a predetermined distance from said substrate, said manufacturing method comprising:

forming a wiring on a part of said substrate;

forming a sacrifice film on said wiring and said substrate with a film thickness greater than said predetermined distance;

flattening a surface of said sacrifice film;

forming an anchor hole part by selectively removing a portion of said sacrifice film that covers said wiring on which said supporting part is to be formed;

depositing a thin-film layer on said sacrifice film and said wiring exposed through said anchor hole part;

selectively removing and patterning said thin-film layer so that a residual portion of said thin-film layer forms said thin-film structural body; and removing said sacrifice film, wherein said wiring is formed to protrude from a surface of said substrate, said supporting part and said floating part are made from a conductive material, said supporting part is formed on said wiring so as to be electrically connected to said wiring, at least one portion of a circumferential edge of said supporting part is placed above an outer edge of said wiring, and said floating part is connected to said at least one portion of said supporting part and extends in a direction departing from the outer edge of said wiring.

2. The manufacturing method of a thin-film structural body according to claim 1, wherein in said flattening of the surface of said sacrifice film, the surface of said sacrifice film is ground.

3. The manufacturing method of a thin-film structural body according to claim 2, wherein in said flattening of the surface of said sacrifice film, said film thickness of said sacrifice film is adjusted to a value which is equal to said predetermined distance.

4. The manufacturing method of a thin-film structural body according to claim 3, wherein in said depositing of said thin-film layer, said thin-film layer is deposited with a film thickness greater than a film thickness of said flattened sacrifice film.

5. The manufacturing method of a thin-film structural body according to claim 1, wherein said thin-film structural body forms at least one portion of a sensor part which is installed in an acceleration sensor and which has a function of detecting an acceleration.

6. A manufacturing method of a thin-film structural body including a conductive supporting part formed on a wiring formed on a surface of a substrate and a conductive floating part supported by said supporting part and placed with a predetermined distance from said substrate, said manufacturing method comprising:

forming a groove having a depth equal to a film thickness of said wiring, said groove being formed on the surface of said substrate and corresponding to at least a portion of said supporting part;

forming said wiring in said groove to obtain a flat surface of said substrate;

forming a sacrifice film covering a surface of said wiring and said surface of said substrate;

forming an anchor hole part by selectively removing a portion of said sacrifice film on which said supporting part is to be formed such that a portion of said wiring is exposed;

depositing a thin-film layer on said sacrifice film and said portion of wiring exposed through said anchor hole part, said thin-film layer comprising a conductive material;

selectively removing and patterning said thin-film layer so that residual portions of said thin-film layer form said thin-film structural body; and removing said sacrifice film.

7. The manufacturing method of a thin-film structural body according to claim 6, wherein in said depositing of said thin-film layer, said thin-film layer is deposited with a film thickness greater than a film thickness of said sacrifice film.

8. The manufacturing method of a thin-film structural body according to claim 6, wherein said forming of said wiring includes:

depositing a conductive film on said substrate having said groove with a film thickness equal to said depth of said groove by using the same material as said wiring; and patterning said conductive film to remove a portion of said conductive film other than a portion located inside said groove, with a predetermined gap dimension from each side wall of said groove so that a residual portion of said conductive film forms said wiring.

9. The manufacturing method of a thin-film structural body according to claim 6, wherein said thin-film structural body forms at least one portion of a sensor part which is installed in an acceleration sensor and which has a function of detecting an acceleration.

10. The manufacturing method of a thin-film structural body according to claim 8, wherein at least one portion of a circumferential edge of said supporting part is placed above an outer edge of said wiring, and said floating part is connected to said at least one portion of said supporting part and extends in a direction departing from the outer edge of said wiring.

* * * * *